Figure 1:
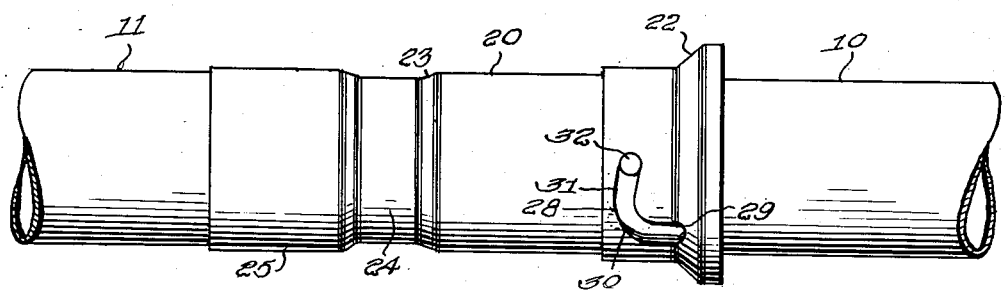

April 1, 1952     E. W. FISHBACK     2,591,531
PIPE COUPLING

Filed July 26, 1948     2 SHEETS—SHEET 1

Inventor
EDWARD W. FISHBACK
By Parker and Walsh
Attorney

April 1, 1952     E. W. FISHBACK     2,591,531
PIPE COUPLING
Filed July 26, 1948                            2 SHEETS—SHEET 2
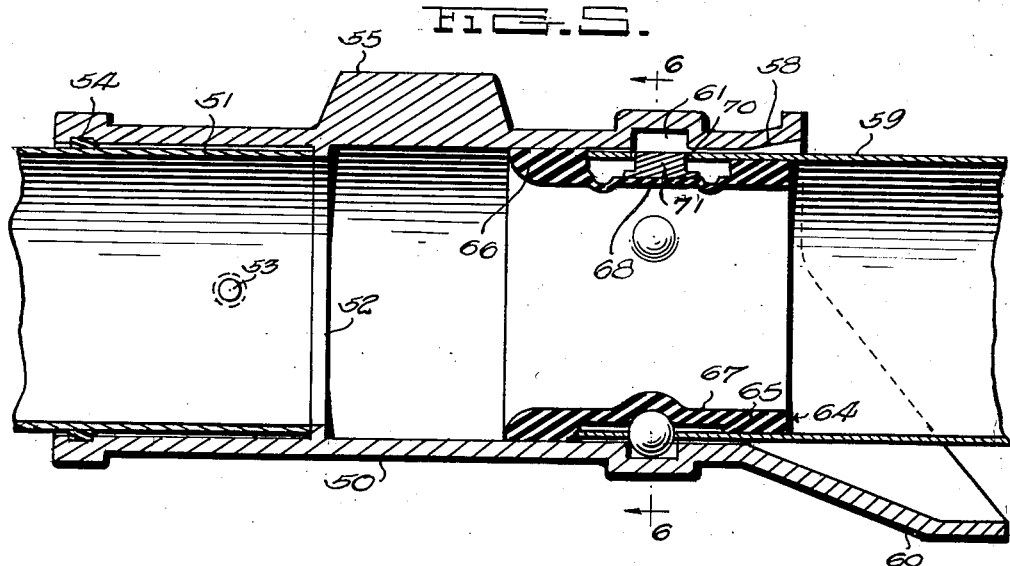
 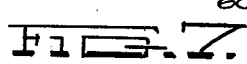
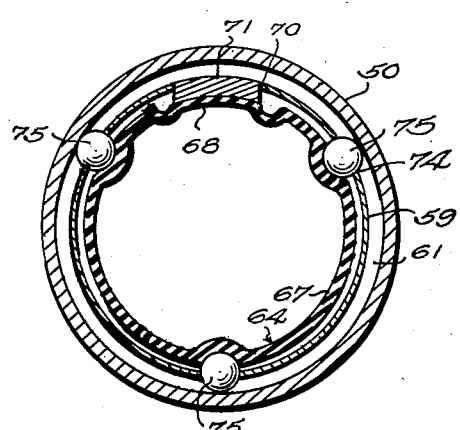 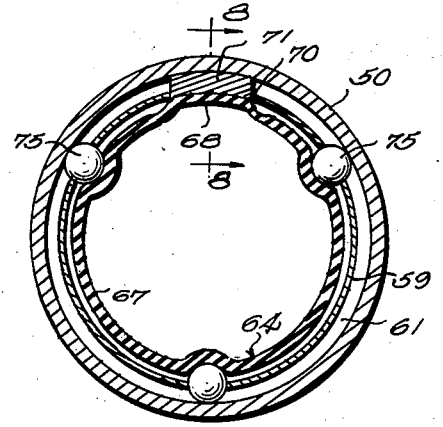
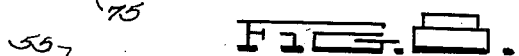
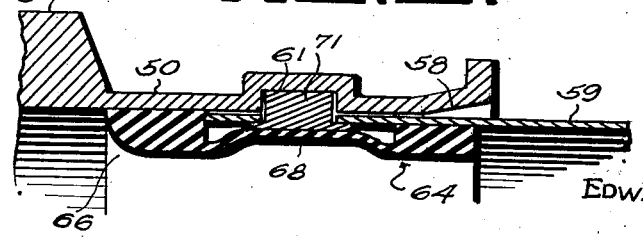
Inventor
EDWARD W. FISHBACK
By Parker and Walsh
Attorneys Patented Apr. 1, 1952

2,591,531

UNITED STATES PATENT OFFICE 2,591,531

PIPE COUPLING

Edward W. Fishback, Orlando, Fla.

Application July 26, 1948, Serial No. 40,767

7 Claims. (Cl. 285—175)

This invention relates to a pipe coupling, and particularly to a coupling device especially adapted for water pipes and the like such as those used in irrigating systems.

An important object of the invention is to provide a novel and simple type of pipe coupling which may be quickly and easily coupled and uncoupled, but which efficiently functions in use to prevent leakage of fluid from the coupling regardless of whether the fluid in the coupling is under relatively low or high pressure.

A further object is to provide such a device which is highly efficient and positive in action and wherein it is unnecessary to employ a latching device which must be manually locked and unlocked.

A further object is to provide such a device which utilizes pressure within the coupling for insuring the positive locking of the parts of the coupling in operative position.

A further object is to provide a device of the character just referred to wherein the means for utilizing internal pressures in the coupling for locking the parts thereof together, when placed at the top of the coupling, will automatically drop by gravity to unlocked position when pressure is relieved in the pipe preparatory to uncoupling the device, thus permitting the uncoupling operation to be very easily carried out.

A further object is to provide for a pipe coupling of the general type referred to wherein a resilient member is employed for moving locking elements into operative position under the influence of water pressure flowing through the device.

A further object is to provide a device of this character wherein the coupling and uncoupling operations may be easily carried out with a minimum of effort on the part of the operator.

Other objects and advantages of the invention will become apparent during the course of the following description.

Figure 2:
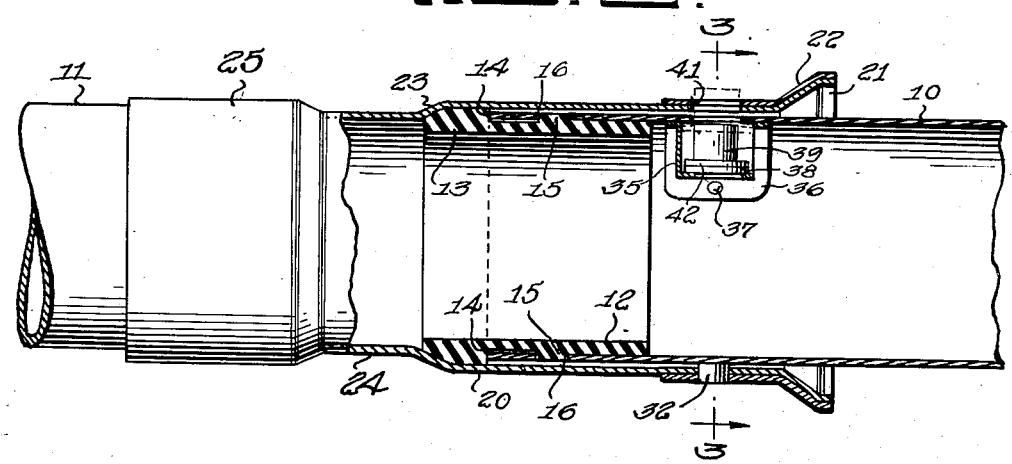
Figure 3:
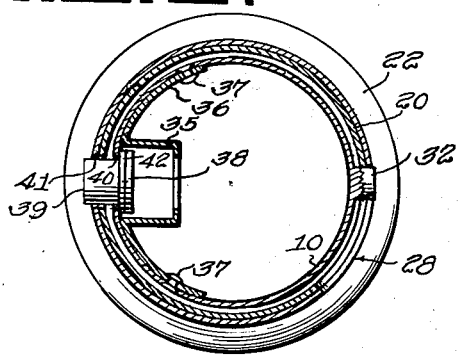
Figure 4:
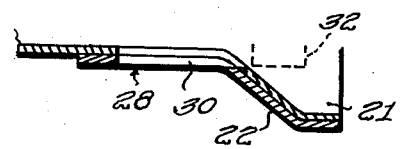

In the drawings I have shown two embodiments of the invention. In this showing:

Figure 1 is a bottom plan view of the device showing the adjacent pipe sections associated therewith, Figure 2 is a central vertical sectional view taken axially through the coupling, parts being broken away and parts being shown in elevation, Figure 3 is a transverse sectional view on line 3—3 of Figure 2, Figure 4 is a fragmentary sectional view taken axially through the bell portion of the coupling sleeve showing the outer end of the pin-receiving slot therein, Figure 5 is a longitudinal sectional view taken vertically through a modified form of the device, Figure 6 is a section taken on line 6—6 of Figure 5, Figure 7 is a similar view showing the locking block in operative position, and Figure 8 is a detailed fragmentary sectional view on line 8—8 of Figure 7.

Referring to Figures 1 and 2, the numerals 10 and 11 designate a pair of pipe sections to be coupled together with the present device. The pipe section 10 becomes the internal unit of the coupling device as will become apparent, and within its end, such pipe section is provided with a rubber or similar deformable sealing sleeve 12. This sleeve has the majority of its length arranged within the pipe section 10, a portion of the sealing sleeve projecting beyond the pipe section 10 as at 13 and being shouldered as at 14 whereby the external diameter of the projecting end of the sealing sleeve is slightly greater than the external diameter of the pipe section 10. The sealing sleeve 12 is provided with a plurality of integral projections 15 engageable in openings 16 formed in the pipe section 10 to position the sealing sleeve with respect to the pipe section 10.

The coupling further comprises an external sleeve 20 having its outer end formed as a bell 21 preferably reinforced as at 22. Adjacent the extremity of the end portion 13 of the sealing sleeve, the coupling sleeve 20 tapers inwardly as at 23 to form a tapered shoulder against which the adjacent end portion of the sealing sleeve 12 is adapted to seat to form a liquidtight seal. Inwardly of the shoulder 23, the coupling sleeve 20 has a cylindrical section 24 and a somewhat enlarged end section 25 receiving the adjacent end of the pipe section 11. This pipe section may be sealed in the coupling end 25 in any suitable manner, as by soldering, riveting or both.

The belled end of the coupling sleeve 20 is provided with a slot indicated as a whole by the numeral 28. This slot has an outer end portion 29 extending through the tapered portion of the bell end of the coupling 20 and its reinforcement 22, but the slot end 29 terminates inwardly from the extremity of the bell end 21. Inwardly of its extremity 29, the slot 28 is curved as at 30 to terminate in a straight end portion 31 inclined as viewed in Figure 1 with respect to a line perpendicular to the axis of the coupling for a purpose to be described. A lug or pin 32 is adapted to seat in the inner extremity of the slot portion 31 when the parts are assembled in operative positions, as will become apparent.

A piston cage 35 is arranged within the pipe section 11 adjacent the inner end of the sealing sleeve 12 as shown in Figure 2. This cage has ends 36 projecting circumferentially on opposite sides thereof and riveted as at 37 to the pipe section 10 to fix the cage in position. A piston 38 is arranged in the cage 35 and carries a radially outwardly projecting pin 39 of substantial size movable through an opening 40 in the pipe section 10. When pressure is present in the pipe coupling, the piston 38 will be moved radially outwardly to project the pin 39 through an opening 41 formed in the adjacent portion of the coupling sleeve 20 and its associated reinforcement 22. Under such conditions, a resilient washer, formed preferably of rubber, and indicated by the numeral 42, will be engaged against the inner surface of the pipe section 10, the surface engageable by the washer 42 being flattened at such point as indicated in Figure 3.

In Figures 5 to 8, inclusive, a highly practicable modified form of the invention is illustrated. Referring to Figure 5, the numeral 50 designates a coupling sleeve into one end of which a pipe section 51 projects to seat against an internal flange 52. The pipe section 51 may be retained in position in any suitable manner, for example, by screws 53. Leakage past the pipe section 51 is prevented by means of a suitable packing element 54, for example an O-ring of normally circular cross-section. The sleeve 50 may be provided, preferably at the top thereof, with a large lug or the like 55 to assist in gripping the coupling when assembling and separating the parts thereof in a manner which will become apparent.

The end of the coupling 50 opposite the pipe section 51 is slightly flared as at 58 to facilitate the entrance of the next adjacent pipe section 59, the flare 58 being extended in the form of a projection 60 to more effectively facilitate the sliding of the pipe section 59 into the adjacent end of the coupling 50. At a point spaced from the flared extremity thereof, the coupling 50 is provided with an internal annular groove 61 for a purpose to be described.

The pipe section 59 carries a resilient sleeve indicated as a whole by the numeral 64. This sleeve comprises an annular rib 65 of an external diameter to seat tightly in the pipe section 59, and an annular flange or rib 66 at the opposite end, adapted to seat in the coupling 50. Between the flanges 55 and 56, the sleeve 64 further comprises a generally cylindrical connecting section 67. The cylindrical section 65 is substantially thinner than the end portions of the sleeve 64 and accordingly possess a higher degree of resiliency. At one portion of its circumference, the cylindrical sleeve section 67 is made relatively thin as indicated by the numeral 68 for the purpose to be described, such portion of the sleeve being normally formed to be offset radially inwardly from the remainder of the cylindrical section 67 as shown in Figure 6.

The pipe section 59 is provided with an opening 70 radially aligned with an aluminum or other suitable locking block carried by the thin sleeve section 68. The block 71 may be fixed to the sleeve section 68 in any suitable manner, and when the parts are in the normal positions shown in Figures 5 and 6, the outer surface of the block 71 is flush with, and forms substantially a continuation of, the outer surface of the pipe section 59 so as to be insertable therewith into the coupling sleeve 50.

In addition to the opening 70 for the locking block 71, the pipe section 59 is provided with a plurality of additional somewhat smaller openings 74 each receiving a ball 75, preferably formed of stainless steel. Each opening 74 is slightly smaller than its associated ball 75 so as to prevent the latter from moving completely through such opening. The inherent resilience of the cylindrical sleeve section 67 tends to maintain each ball 75 at its radially outer limit of movement and engagement with the wall of the associated opening 74.

Operation

The operation of the form of the device shown in Figures 1 to 4, inclusive, will be first described. As previously stated, the slot end 39 projects through the tapered portion of the bell end 21 of the housing 20 and its associated reinforcement 22. The distance from the axis of the pipe section 10 to the slot end 29 is slightly greater than the distance from such axis to the radially outer end of the pin 32. In assembling the device, therefore, the pipe section 10 may be entered axially into the coupling sleeve 20 and the pin 32 will enter the end 29 of the slot 28. The bell end 21 assists in the quick and easy entrance of the pipe section 10 into the coupling sleeve 20.

The foregoing operation is preferably carried out with the inner extremity of the slot portion 31 arranged at the bottom of the device. In such case, the piston 38 and its associated pin 39 will be arranged at the top and the piston will rest by gravity in the bottom of the cage 35, which is open as shown in Figure 2, for the ready access of fluid pressure to the bottom of the piston 38 for a reason to be described. Having entered the pin 32 in the outer end of the slot 28, the coupling sleeve 20 will be held stationary while the pipe section 10 is moved inwardly and then turned as the pin 32 follows the curved slot portion 30. This turning movement is continued as the pin 32 enters the slot portion 31, until the pin 32 engages the inner extremity of such slot portion. When this point is reached, the plunger pin 39 will be arranged in direct alignment with the opening 41.

It will be apparent that after the pin 32 has entered the curved slot portion 30, the inner extremity of the sealing sleeve 13 will contact the upturned shoulder 23. The curvature of the slot portion 30 is such that the pipe section 10 will be cammed axially inwardly to deform the inner extremity of the sealing sleeve portion 13 against the shoulder 23. A leakproof joint is thus provided between the sealing sleeve and the coupling sleeve 20.

When water or other fluid is turned into the pipes after the coupling operation is finished, the piston 38 will be moved upwardly to move the pin 39 through the opening 41 to the position shown in Figure 3. In practice, it has been found that the piston 38 moves so freely that air pressure built up in the coupling as water enters the pipes will move the piston 38 to its operative or locking position. So long as pressure remains in the pipes, the piston will be held at its outermost position with the washer 42 held in tight engagement with the surface surrounding the opening 40, thus efficiently preventing any leakage around the pin 39. It also will be apparent that internal pressure effectively increases the sealing of the coupling by the radially outward force exerted against the portion 13 of the sealing sleeve 12.

The double thickness of material provided by the reinforcing member 22 provides an adequate seat against which the pins 32 and 39 are engageable under longitudinal pressure forces exerted by the fluid within the pipes. The inclusion of the slot portion 31 eliminates any possible tendency toward uncoupling movements, longitudinal pressure forces tending to seat the pin more tightly in the adjacent end of the slot 28. It will be noted that there is a slight space provided between the pipe section 10 and the surrounding portion of the coupling sleeve 20. This not only facilitates the assembling of the elements but also permits the coupled joint to be somewhat flexible. The pins 32 and 39 being vertically arranged in the preferred practice, the pipe section 10 may be swung slightly and no leakage will result due to the effective sealing of the sleeve end 13 against the shoulder 23. This is important in the coupling of long pipe lines since it permits them to change direction slightly in a horizontal plane.

When it is desired to uncouple the pipes, pressure is released therein, whereupon the pin 39 and its piston 38 will drop by gravity to the position shown in Figure 2. In actual practice, when the liquid is released from the pipes it has been found that appreciable vacuum is created within the coupling to assist the force of gravity in moving the piston 38 downwardly, thus making such movement, in effect, a positive one. The pin 39 having been released from the opening 41, the pipe 10 may be turned on its axis with the pin 32 following the slot 28 until the pin 32 leaves the slot end 29. This action may be quickly and readily performed. The slight spacing of the sleeve 20 from the adjacent end of the pipe section 10 not only provides a reasonable degree of flexibility in the coupling, but also eliminates any possible binding of the sleeve 20 relative to the pipe section 10. This fact also assists in rendering the coupling and uncoupling actions very easily performed.

In the form of the invention shown in Figures 5 to 8 inclusive, the sleeve 64, blocks 71 and balls 75 will be carried by the pipe section 59. When the parts are to be assembled, the end of the pipe section 59 is inserted into the adjacent end of the coupling 50, preceded, of course, by the flanged end 66 of the sleeve 64. The entering end of the pipe section may ride upwardly and inwardly over the projecting flared portion 60 of the sleeve 50, and then will enter the main body of the coupling sleeve 50. The flared surface 58 will act to cam the balls 75 inwardly against the resiliency of the sleeve portion 67. As soon as the balls 75 reach positions in transverse alignment with the groove 61, they will be immediately moved outwardly by the resilient force of the sleeve portion 67.

The balls 75, under the influence of the radially outward force exercised by the sleeve portion 67, tend fairly strongly to hold the pipe section 59 in its proper assembled position relative to the sleeve 50. The inner surface of the sleeve 50 lies only slightly radially outwardly of the centers of the balls 75 and accordingly it requires some little force for the balls to be cammed out of the groove 61. Thus the parts will remain in operative position until water is turned into the pipe section and brings pressure therein.

Inasmuch as the locking block 71 is carried by the thin sleeve wall 68, it requires very little internal pressure to move the wall section 68 outwardly. Almost as soon as water is turned into the pipes therefore the locking block 71 will be moved radially outwardly into engagement with the groove 61 to lock the parts in operative positions. As the internal pressure builds up, more and more radially outward force is transmitted through the sleeve section 67 to tend to lock the balls 75 in the groove 61. Thus in operation, the parts are effectively and positively locked against displacement from their proper operative positions.

The locking block 71 preferably will be arranged at the top of the device as shown in Figures 5 to 8 inclusive. The parts assume the positions shown in Figures 5 and 6 when no internal pressure is present in the sleeve 64. Upon the introduction of pressure, the sleeve wall portion 68 yields under the influence of the water pressure to move the block 71 upwardly into the groove 61 as shown in Figures 7 and 8.

When the parts are to be disconnected, the pressure is released from the outlet end of the system and the pipe 59 is drained. The block 71 thereupon drops by gravity back to the normal position shown in Figures 5 and 6. Actually, the wall section 68 may possess sufficient resilience to bias it back to its normal position, regardless of whether the block 71 is arranged at the top of the device. As soon as the block returns to its normal position, a pulling force on the pipe section 59 will cause the balls 75 to be cammed out of the groove 61, whereupon the parts may be readily separated.

The single resilient sleeve 64 therefore serves as means to bias the balls 75 outwardly for initial engagement of the pipe section 59 with the coupling sleeve 50. It also serves as means responsive to pressure therewithin to move the block 71 to its operative position and to transmit pressure forces to the balls 75 to hold them in their locking positions, thus positively preventing displacement of the parts when in operation. The sleeve 64 also serves to prevent leakage since the flange portion 66 will be seated outwardly against the internal surface of the sleeve 50 when pressure is present in the device.

I claim:

1. A pipe coupling comprising a coupling sleeve, a tubular member having one end insertable into said coupling sleeve, a sealing sleeve arranged in the inserted end of said tubular member and projecting therebeyond for engagement with the adjacent inner surface of said coupling sleeve whereby internal pressures in the coupling device seat said sealing sleeve against the inner surface of said tubular member and against the adjacent inner surface of said coupling sleeve, a radial pin carried by said tubular member, said coupling sleeve having an angular slot to receive said pin, said pin assuming an operative position at the inner limit of said slot, said coupling sleeve being provided at a point circumferentially spaced from said pin with a radial opening, said tubular member being provided with a radial opening aligning with the radial opening in said coupling sleeve when said pin is in operative position, and a pressure-operated pin movable into said radial openings to lock said tubular member and said coupling sleeve together when pressure is present in the coupling device.

2. A pipe coupling comprising a coupling sleeve, a tubular member having one end insertable into said coupling sleeve, a sealing sleeve arranged in the inserted end of said tubular member and projecting therebeyond for engagement with the adjacent inner surface of said coupling sleeve whereby internal pressures in the coupling device seat said sealing sleeve against the inner surface of said tubular member and against the adjacent inner surface of said coupling sleeve, a radial pin carried by said tubular member, said coupling sleeve having an angular slot to receive said pin, said pin assuming an operative position at the inner limit of said slot, said coupling sleeve being provided at a point circumferentially spaced from said pin with a radial opening, said tubular member being provided with a radial opening aligning with the radial opening in said coupling sleeve when said pin is in operative position, and a pressure-operated pin movable into said radial openings to lock said tubular member and said coupling sleeve together when pressure is present in the coupling device, the end of said coupling sleeve into which said tubular member is inserted being tapered to increase in size to provide a bell end, said slot having an entering end for said radial pin substantially parallel to the axis of said coupling sleeve and terminating inwardly of the extremity of said bell end whereby the latter is annularly continuous.

3. A pipe coupling comprising a coupling sleeve, a tubular member having one end insertable into said coupling sleeve, a sealing sleeve arranged in the inserted end of said tubular member and projecting therebeyond for engagement with the adjacent inner surface of said coupling sleeve whereby internal pressures in the coupling device seat said sealing sleeve against the inner surface of said tubular member and against the adjacent inner surface of said coupling sleeve, a radial pin carried by said tubular member, said coupling sleeve having an angular slot to receive said pin, said pin assuming an operative position at the inner limit of said slot, said coupling sleeve being provided at a point circumferentially spaced from said pin with a radial opening, said tubular member being provided with a radial opening aligning with the radial opening in said coupling sleeve when said pin is in operative position, a cage in said tubular member, a piston carried by said cage and having a locking pin aligned with the opening in said tubular member whereby, when said radial pin is in operative position and pressure is present in the coupling device, said piston will be moved radially outwardly to insert said locking pin through said radial openings, and a sealing washer carried by the radially outer face of said piston to engage the surface of said tubular member surrounding the radial opening therein to seal the latter against leakage.

4. A pipe coupling comprising a coupling sleeve, a tubular member insertable therein, an annular resilient member within the inserted end of said tubular member, said tubular member having an opening and said sleeve having an internal recess registering with said opening, and a locking member in said opening engaging said reslient member and normally arranged with its outer surface flush with the outer surface of said tubular member, said resilient member being subject to radial deformation by fluid pressure therewithin to move said locking member outwardly into said recess.

5. A pipe coupling comprising a coupling sleeve, a tubular member insertable therein, an annular resilient member within the inserted end of said tubular member, said tubular member having an opening and said sleeve having an internal recess registering with said opening, and a locking member in said opening engaging said resilient member and normally arranged with its outer surface flush with the outer surface of said tubular member, said resilient member being subject to radial deformation by fluid pressure therewithin to move said locking member outwardly into said recess, said resilient member having a portion extending beyond the inserted end of said tubular member and having an external diameter approximately equal to the internal diameter of said sleeve to be held in leak-proof engagement therewith by fluid pressures within said resilient member.

6. A pipe coupling comprising a coupling sleeve, a tubular member insertable therein, an annular resilient member engaging said sleeve and said member and expansible into sealing engagement therewith by internal pressures in said sleeve and said member, a locking member mounted for radial movement and subject to said internal pressures to be moved radially outwardly into locking engagement with said coupling sleeve, said tubular member having an opening in which said locking member is mounted, and means normally supporting said locking member in a radially inner position with the radially outer surface of said locking member substantially flush with the outer surface of said tubular member.

7. A pipe coupling comprising a coupling sleeve, a tubular member having one end insertable to a predetermined position in said sleeve, a radially movable locking member normally occupying a radially inner position in which the radially outer extremity of said member does not project beyond said tubular member, said locking member being subject to internal pressures in said sleeve and said tubular member to be moved radially outwardly to a locking position and said sleeve having a portion engageable by said locking member when the latter is in its operative position to positively prevent said tubular member from being detached from said sleeve, and holding means independent of said locking means for detachably connecting said tubular member in said predetermined position to said sleeve independently of pressures in said sleeve and said tubular member.

EDWARD W. FISHBACK.

REFERENCES CITED

The following references are of record in the file of this patent:

UNITED STATES PATENTS

| Number | Name | Date |
| --- | --- | --- |
| 2,269,560 | Stout | Jan. 13, 1942 |
| 2,310,744 | Osborn | Feb. 9, 1943 |
| 2,321,778 | Stout | June 15, 1943 |
| 2,464,466 | Stout | May 15, 1949 |

FOREIGN PATENTS

| Number | Country | Date |
| --- | --- | --- |
| 387,169 | Germany | Dec. 15, 1922 |